May 6, 1969     D. L. SEIWERT     3,442,442
MOUNTING OF BLADES IN AN AXIAL FLOW COMPRESSOR
Filed Dec. 2, 1966     Sheet _2_ of 2
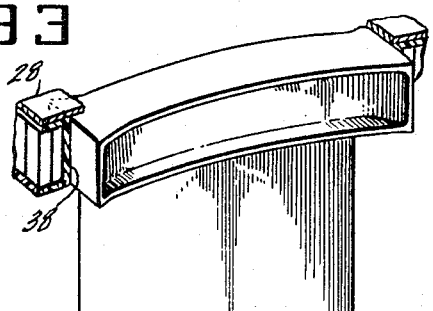
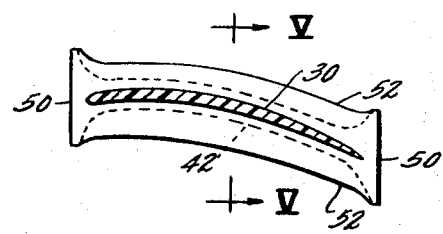
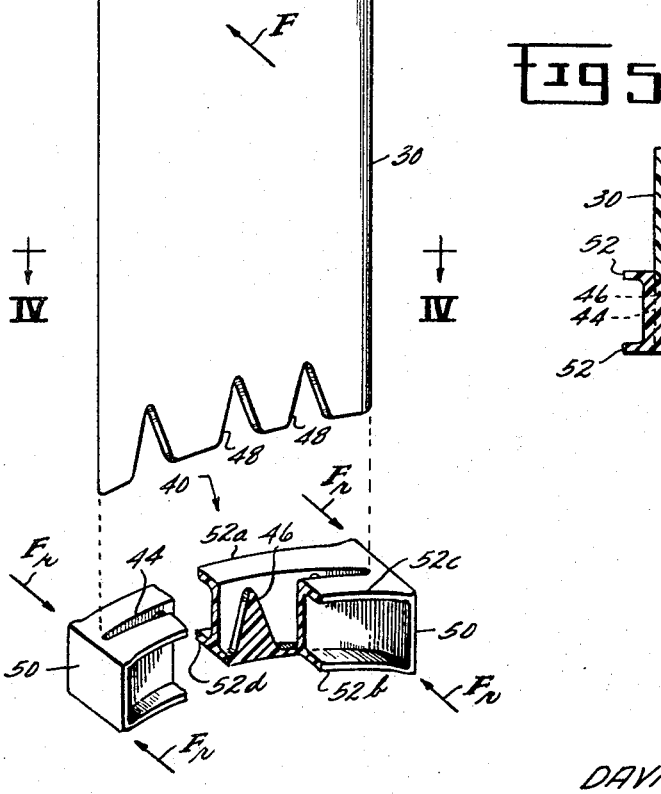
INVENTOR.
DAVID L. SEIWERT
BY
ATTORNEY United States Patent Office 3,442,442
Patented May 6, 1969

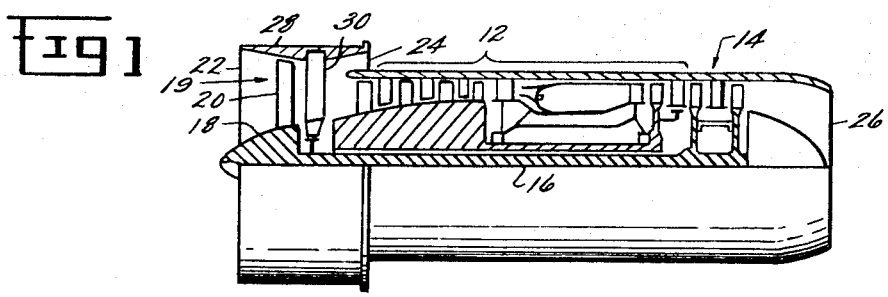
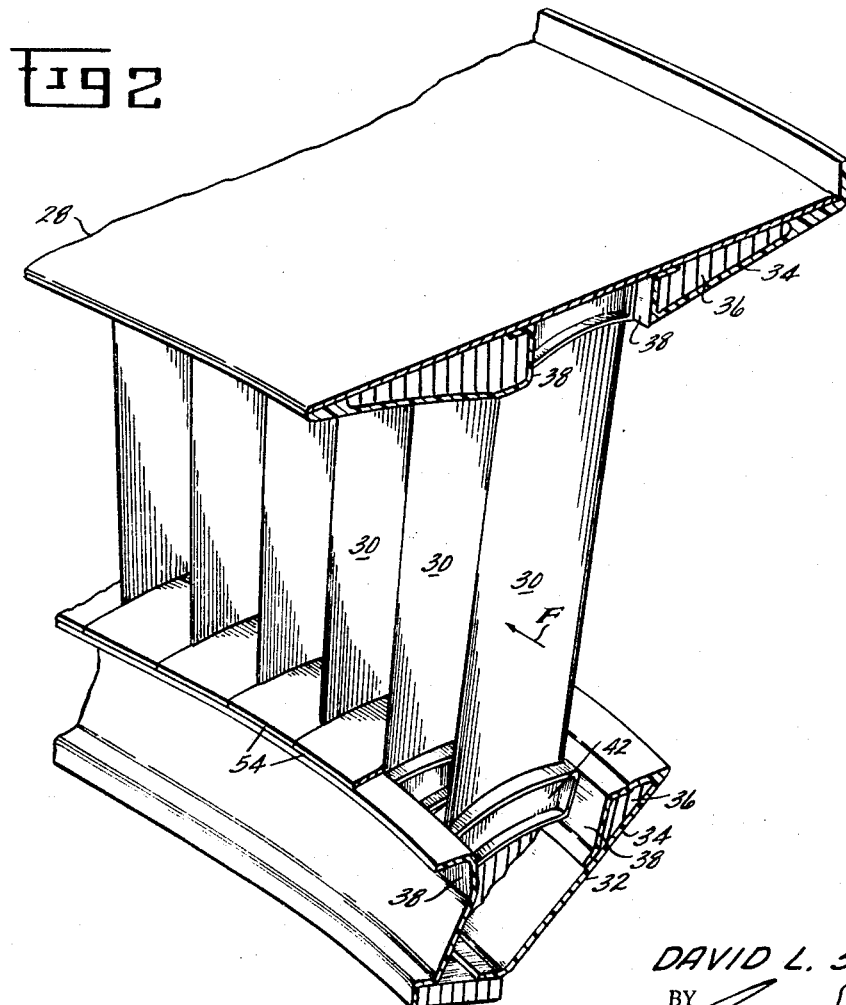

1

3,442,442
MOUNTING OF BLADES IN AN AXIAL FLOW
COMPRESSOR
David L. Seiwert, Cincinnati, Ohio, assignor to General
Electric Company, a corporation of New York
Filed Dec. 2, 1966, Ser. No. 598,657
Int. Cl. F04d 29/34
U.S. Cl. 230—133                                7 Claims

ABSTRACT OF THE DISCLOSURE

The disclosure shows a compressor comprising a stator assembly, the blades of which are formed of bonded glass fibers. Structural support of the stator is provided by mounting feet respectively receiving the inner and outer ends of the blades. The blades are bonded to the mounting feet and the mounting feet, in turn, are bonded to inner and outer concentric, axially spaced rings.

---

The present invention relates to improvements in axial flow compressors particularly adapted for gas turbine engines and more specifically to improved mounting of blades ideally suitable to stator assemblies thereof.

As a general proposition, it can be said that there is a constant endeavor to improve the thrust to weight ratio of gas turbine engines and other propulsive engines as well. One of the approaches to this broad end is to reduce the weight of structural components of such engines. This has led to an intensive effort to utilize laminated structures, such as plastic resins, epoxy for example, reenforced with glass fibers. Such laminates are particularly attractive in the fabrication of compressors which are an essential element of gas turbine engines either in the generation of a hot gas stream or the pressurization of air which is to be discharged through a nozzle to obtain a propulsive force.

Attempts to utilize laminated structures have encountered serious problems in mounting airfoil blades or vanes to a support structure. (While the term "blades" normally denotes airfoils on a rotor and "vanes" denotes stator airfoils, the former term is used herein as generic to both.) These problems are applicable both in mounting blades to a rotor and in mounting stator blades to frame elements. Since these laminant structures employ extremely thin structural sub-components, they are extremely vulnerable to bending stresses which are induced herein when attempting to employ mounting techniques, such as the use of tangs, which is a commonly accepted technique in mounting non-laminated components.

Accordingly, the object of the invention is to facilitate the use of laminated blades in axial flow compressors and thereby enable greater thrust to weight ratios of gas turbine engines or the like.

These ends are attained by the provision of a blade assembly comprising a support member having a circumferential row of airfoil shaped blades projecting therefrom. The supporting member includes axially spaced rings, having substantial annular depth, respectively at the leading and trailing edges of the blades. Mounting feet are respectively bonded to the blades and the opposed surfaces of the rings to complete the assembly.

Preferred features of the invention are found in the configuration of these mounting feet, which are slotted in their body portions to receive an end portion of the blades. Pads at opposite ends facilitate bonding to the support rings. Flanges projecting from the body portions and extending between the pads, and also ribs within the slots minimize stress loadings.

The above and other related objects and features of the invention will be apparent from a reading of the following description of the disclosure found in the accompanying drawings and the novelty thereof pointed out in the appended claims.

In the drawings:

FIGURE 1 is a schematic view of a gas turbine engine in which the present invention is embodied;

FIGURE 2 is a fragmentary perspective view of a casing and stator assembly seen in FIGURE 1;

FIGURE 3 is an enlarged perspective view with portions exploded of a blade seen in FIGURE 2;

FIGURE 4 is a section taken on line IV—IV, of FIGURE 3 and FIGURE 5 is a section taken on line V—V in FIGURE 4.

FIGURE 1 illustrates a gas turbine engine 10 in which the present invention is incorporated. The engine 10 is of the turbo-fan type comprising a core engine 12 which generates a hot gas stream. This gas stream then passes through and drives a turbine 14 which is connected, by a shaft 16 pass through the interior of the engine 12, to the rotor 18 of a fan 19. The rotor 18 has fan blades 20 projecting therefrom which draw air through the engine inlet, at 22, and pressurize this air for discharge through an annular nozzle 24 to provide a propulsive force. A portion of the air pressurized by the rotating blades 20 also enters the core engine 12 to support fuel combustion in the generation of the gas stream. Energy not extracted by the turbine 14 is converted to a propulsive force by discharging the hot gas stream through a nozzle 26.

A casing 28, appropriately connected to the structure of the core engine, surrounds the blades 20 and defines the outer bounds of the inlet 22 and the nozzle 24. The casing 28 also supports a stator assembly comprising blades 30 which properly direct the pressurized air for discharge through the nozzle 24 and entry into the core engine 12. In order to minimize the overall weight of the engine and particularly that of the stator assembly, many components thereof are formed of nonmetallic materials and/or light-weight laminated structures. In attaining these ends of weight reduction, the blades 30 are of a laminated structure, preferably comprising glass or other fibers or filaments, a majority of which are usually oriented lengthwise of the blades. These fibers provide reinforcement to a resin body as may be formed of epoxy to give extremely rigid blade structure as related to its high strength to weight ratio.

The blades 30 extend inwardly from the casting 28 to an inner ring 32. Consistent with the desired minimization of weight, the casing 28 and inner ring 32 are shown as composite assemblies having relatively thin skin portions 34 with honeycombed sheet metal 36 sandwiched therebetween. The skin portions 34 of both the casing 28 and inner ring 32 may also form support rings 38 at the leading and trailing edges of the blades 30 at the opposite ends thereof. Mounting feet 40 are secured to opposite ends of the blades 30 and to the supporting rings 38 to complete the structural portions of the stator assembly.

Reference is next made to FIGURES 3–5 for a detailed description of the mounting feet 40 and the manner of their connection to the blades 30 and support rings 38. Each mounting foot has a body portion 42 having a curvature generally conforming to the airfoil curvature of the blade 30. The body portion 42 has a slot 44, extending almost to its full depth, which contiguously receives the end of the blade 30. Triangularly shaped ribs 46 project into the slot 44 from the bottom of the body portion 42 to almost the top thereof. The ends of the blade 30 are provided with notches 48 which register with the ribs 46 when the blade end is inserted into the slot 44. When the blade is thus assembled, it may be bonded to the mounting foot 40 by the use of an adhesive such as uncured thermo-setting epoxy resin which has been applied to the mating parts prior to assembly and later cured.

It will further be noted that each mounting foot has at its opposite ends, pads 50, which extend to the full height (or depth) of the body portion 42 and laterally thereof. The pads are interconnected by flanges 52 extending from the bottom and top, in opposite directions, of the body portion 42. The mounting feet 40 are secured to the support rings 38 by adhering the pads 50 thereto. Again epoxy resin may be utilized for this purpose as by application of uncured resin to the pads 50 prior to assembly with the support rings 38 and later cured.

The described assembly and particularly the mounting feet 40 has many advantages in providing high strength, rigidity and minimum stress concentrations which will greatly increase the working life of the stator assembly employing nonmetallic materials or materials which can't be assembled by conventional techniques. It will be noted that the force loading on the stator blades, in a normal operation, is generally in the direction of the arrow F in FIGURES 2 and 3. The resultant loading transmitted to the port rings 38 is a force couple represented by the arrow $F_r$ in the FIGURE 3. The stresses caused by the force loading are effectively transmitted from the blade 30 to the upper flange portion 52a and the lower flange portion 52b directly by the portion of the blade which is telescoped into the slot 44. The ribs 46 transmit the force loadings to the remaining flange portions 52c and 52d. The several flange portions are thus effective and carrying the force loading thereon and transmitting it to the pads 50 with a minimum of stress in any particular portion. Further, maximum effectiveness is obtained as the flanges are approximately equally spaced from the torque center which is created by the force loading transmitted from the blade 30 to the mounting foot 40. This force loading is then transmitted to the pad 50 which transmit the force loading to the supporting rings 38 in shear with a minimum of stress.

The force F on the blade 30 is in the direction which exists during normal operation. However, abnormal conditions are also encountered in which air flowing past the blades separates therefrom under what is termed a stall condition. When a stall occurs the force loading on the blades is essentially in the opposite direction. It will be apparent that the described mounting means are equally effective when subject to the force loadings of a stall condition.

Another advantage of the described mounting feet is that the upper flanges 52 may function to serve as supports for relatively thin strips 54, as of aluminum, which may extend between the blades 30 (FIGURE 2) to define a smooth inner and outer bounds for the flow path of air through the stator assembly.

While the present disclosure illustrates the use of the present invention in a stator assembly for a so-called fan of a turbo-fan engine, it should be recognized that such fans are in fact axial flow compressors. The present inventive concepts therefore are applicable to axial flow compressors in general, and in their broader aspects, to mounting of blades on compressor rotors where materials other than solid metals are employed. The scope of the invention should therefore be derived solely from the following claims.

Having thus described the invention what is claimed as novel and desired to be secured by Letters Patent of the United States is:

1. In an axial flow compressor for a gas turbine engine or the like,
a blade assembly comprising a support member having a circumferential row of airfoil shaped blades projecting therefrom, said blades being formed of bonded fibers and said support member comprising axially spaced supporting rings disposed at the radial inner ends of said blades and having opposed surfaces of substantial annular depth respectively disposed at the leading and trailing edges of said blades; and
mounting feet having radial openings corresponding to the cross section of said blades and contiguously receiving the inner ends of said blades, said blades having generally uniform thickness, in a lengthwise sense, from immediately outside said feet to a point within said openings, said mounting feet being respectively bonded to the contiguous portions of said blades and said opposed ring surfaces.

2. A blade assembly as in claim 1 which is a stator assembly and the support member comprises an outer pair of concentric, axially-spaced support members between which the blades extend, and
further mounting feet having radial openings corresponding to the cross section of said blades and contiguously receiving the outer ends of said blades, said blades having generally uniform thickness at their outer ends, in a lengthwise sense, from immediately outside said feet to a point within said openings, said further mounting feet being respectively bonded to the contiguous portions of said blades and to said outer support member.

3. An axial flow compressor assembly as in claim 1 wherein;
each of said mounting feet has a body portion with a curvature approximating the curvature of said airfail blades, said opening being formed in said body portion.

4. An axial flow compressor assembly as in claim 3 wherein;
each mounting foot has pads at its opposite ends which are bonded to said supporting rings, said pads having a height approximating that of said body portion and a width substantially greater than said body portion.

5. An axial flow compressor assembly as in claim 4 wherein;
flanges projecting from the upper and lower portions of said body portion extend between said pads.

6. An axial flow compressor assembly as in claim 5 wherein;
ribs extend from the bottom of said slot to at least approximately the top thereof, and
the end portion of said blade has notches registering with said ribs.

7. An axial flow compressor assembly as in claim 6 wherein;
said ridges and notches are triangular.

References Cited

UNITED STATES PATENTS

| 2,868,441 | 1/1959 | Peutt | 253—77 |
| 3,291,382 | 12/1966 | Blackhurst et al. | 230—122 |
| 822,801 | 6/1906 | Wilkinson | 253—77 |
| 2,868,439 | 1/1959 | Hampshire et al. | 230—133 |
| 2,934,317 | 4/1960 | Warnken | 230—133 |
| 2,968,468 | 1/1961 | Welsh | 230—133 |

FOREIGN PATENTS 1,095,453  12/1960  Germany.

HENRY F. RADUAZO, *Primary Examiner.*

U.S. Cl. X.R.

230—122; 253—77